United States Patent [19]
Lucas

[11] Patent Number: 5,203,479
[45] Date of Patent: Apr. 20, 1993

[54] STORAGE CARRIER FOR VEHICLE EXTERIOR

[76] Inventor: Adelmer B. Lucas, 107 Westview Rd., Erie, Colo. 80516

[21] Appl. No.: 847,607

[22] Filed: Mar. 2, 1992

[51] Int. Cl.$^5$ .................. B62D 43/00; B60R 5/00
[52] U.S. Cl. ..................... 224/42.13; 224/42.12; 296/37.1; 296/37.6
[58] Field of Search ............. 224/42.13, 42.12, 42.14, 224/42.15, 42.2, 42.26; 296/37.1, 37.2, 37.3, 37.6; 280/160; 206/304, 303; 211/23, 24

[56] References Cited

U.S. PATENT DOCUMENTS

| | | | |
|---|---|---|---|
| 1,111,189 | 9/1914 | Sly | 224/42.12 |
| 4,771,926 | 9/1988 | Anderson et al. | 224/42.13 |
| 5,085,360 | 2/1992 | Fortune et al. | 224/42.13 |

*Primary Examiner*—Henry J. Recla
*Assistant Examiner*—David J. Walczak
*Attorney, Agent, or Firm*—Charles C. Corbin

[57] ABSTRACT

Disclosed is storage carrier that is removably mountable to a vehicle spare wheel, the spare wheel including rubber tire and being mounted on the exterior of the vehicle rear wall and held spaced from and adjacent to the rear wall in an upright position. The carrier includes a wheel-mounting cap having walls that provide a downwardly facing cavity with a concave interior surface, and adapted to be received over the upper part of the spare wheel. A storage container is attached to the rear wall of the cap or is molded to be integral with the cap, and an adjustable strap extending from the cap can be used to embrace the periphery of the spare wheel tire to urge the cap downwardly upon the tire and to hold it in position on the tire.

23 Claims, 2 Drawing Sheets

STORAGE CARRIER FOR VEHICLE EXTERIOR

BACKGROUND OF THE INVENTION

1. Field of the Invention

The present invention relates to removable storage devices that are mountable to the rear of a motor vehicle. More particularly, the invention relates to such a device that is attachable to an exteriorly mounted spare wheel.

2. Description of the Prior Art

Oftentimes the need arises in vehicles such as cars, vans, four-wheel-drive vehicles and RV's for additional storage space beyond the space that is available in vehicle trunks, or behind the passenger seats in vehicles that don't have trunks. The trend towards downsizing of certain vans and like vehicles has made storage space needs more pronounced in such vehicles. Some prior art approaches to the problem involve alteration of trunk space such as shown in U.S. Pat. No. 2,069,345. In other cases, portable storage trunks have been devised for attachment at the rear of a vehicle. For example, in U.S. Pat. No. 4,884,528 a box-like trunk with retractable wheeled legs is mountable to a trailer hitch at the rear of the van. In U.S. Pat. No. 3,999,693 a portable carrier is attached to the rear wall and bumper of a car. Such approaches may alleviate the storage problem, however, they can be unduly complex, relatively expensive, and require means to avoid obscuring the rear license plate and rearward facing signal and brake lights.

The need for increased storage space has led to the development of a variety of cargo carriers that can be mounted to the roof of a vehicle. Such carriers can be relatively expensive. Unfortunately, particularly with tall vehicles such as RV's and vans, they can be impractical, inconvenient and unsafe with respect to their loading and unloading. In addition, rooftop mounted carriers give a vehicle an unfavorable aerodynamic profile affecting fuel economy and vehicle stability.

In a further attempt to increase the availability of interior space in a vehicle it has been a practice to mount a vehicle spare tire to the exterior of the vehicle rear wall.

SUMMARY OF THE INVENTION

In view of the aforestated drawbacks and limitations of the prior art, it is a general object of the present invention to provide an improved way to supplement the storage capacity of a vehicle.

Another object of the present invention is to provide a practical, easy-to-use and relatively inexpensive storage device for attachment to the exterior of a vehicle.

Yet another object of the present invention is to provide a practical, rear-mounted storage device that requires no alteration of vehicle structure and which will not obscure a license plate or rear lights.

Yet another object is to provide a portable carrier that can be quickly and simply mounted to and removed from the exteriorally mounted spare wheel of a vehicle.

It will be apparent that these and other objects and advantages can be provided by the present invention which is a portable carrier mount that is attachable to the spare wheel of a vehicle, where the spare wheel, including rubber tire, is secured in upright position adjacent the rear wall of the vehicle. The device features a saddle cap having spaced-apart front and rear walls which adjoin a curved middle wall to provide a downwardly facing cavity or socket with a concave, inner surface, the socket adapted to receive an upper segment of the spare wheel, the concave surface engaging the periphery of the rubber tire and the front and rear walls of the cap adapted to hold the cap against forward and rearward movement. The rear wall is also adapted to be attached to means for holding a useful load, such as a carrier that comprises a generally rectangular lid-equipped enclosure. Finally, the mount includes flexible, adjustable strap means extending from lower edges of the curved wall of the cap and adapted to embrace the outer periphery of the spare tire to hold the cap downwardly into engagement with the tire. In one embodiment of the invention the cap has a flexible mesh structure. In other embodiments the cap rear wall is integral with the forward wall of a carrier case, the case having spaced-apart walls, a bottom and a lid.

The invention may be particularly described and appreciated in all its aspects by reference to the drawings, detailed description and claims which follow.

DETAILED DESCRIPTION OF THE INVENTION

Figure 1:
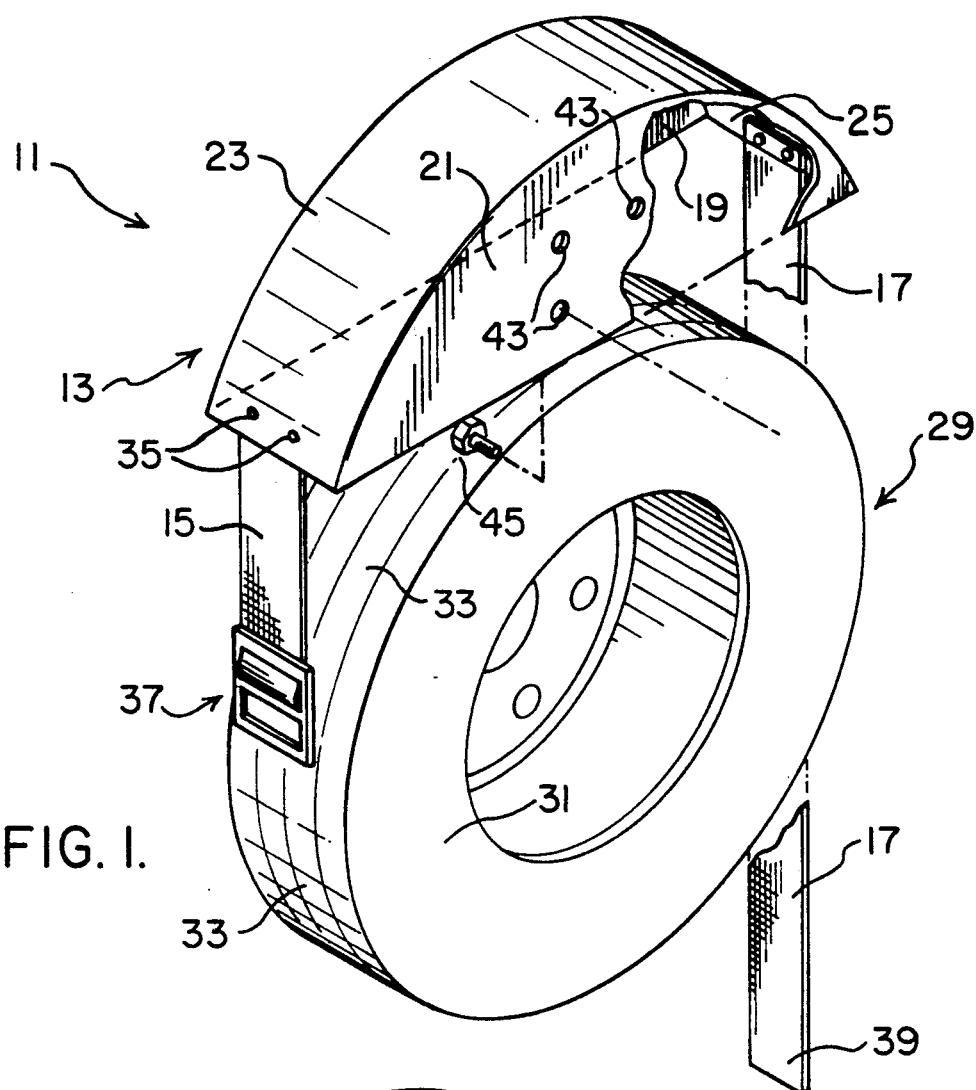
FIG. 1 is an exploded, perspective view showing a preferred embodiment of a carrier holder according to the present invention.

Referring now to the drawings, FIG. 1 illustrates that the main components of a carrier mount 11 according to one preferred embodiment of the invention includes a saddle cap 13 and an adjustable tire-engaging belt that includes one strap 15, and a second strap 17. In this preferred embodiment the saddle cap 13 has a molded glass fiber reinforced polymeric construction and is formed using any of a variety of techniques well knowne in the fiberglass forming and plastics molding industry. In this manner a relatively light, yet strong, durable and relatively rigid structure is provided in cap 13. It is to be understood that cap 13 can also be fabricated of various other suitable materials including metals and composites. Cap 13 has a front wall 19, which will be seen to lie spaced from the rear wall of a vehicle, rear wall 21, and a curved wall 23 that provides a generally concave inner surface 25. It is evident from FIG. 1 that a downward-facing cavity is thus provided in cap 13, which cavity is designed to lay over the upper part of a spare wheel 29. The spacing between front and rear walls 19 and 21, and the curvature of concave surface 25 will be commensurate with the size of the spare tire. The use of protective covers for spare tires will be taken into consideration in the design of the cap cavity. It is preferable that the cap 19 is dimensioned such that the upper one-quarter to one-third of the wheel 29 is received within the cavity of cap 13, and ideally the curvature of the concave surface 25 approximates the circular curvature of the tire outer periphery 33 so as to give maximum surface-to-surface contact between the tread at 33 and the concave surface 25. The spacing between front and rear walls 19 and 21 is slightly larger than the width of tire 31 and will lie sufficiently close to the sides of tire 31 which they are designed to abut to limit the forward or rearward movement of a cap 13. It is contemplated that in some cases the concave surface 25 may be modified in certain ways to enhance surface-to-surface contact with tire periphery 33. This could include the application of a layer of suitable elastomer material over the concave surface 25.

The strap material is preferably a high strength, lightweight nylon webbing which is durable in an outside environment. In this regard it should be evident that there is a variety of conventional materials that can be suitably employed. In FIG. 1 one strap 15 is secured to one end of curved wall 23 using rivets 35, or other suitable fasteners. The other strap 17 is secured to the other side of the wall 23 in a similar fashion, and there is a conventional frictional buckle 37 that is designed to receive the free end 39 of strap 17. Straps 15 and 17 are connected at the middle of the ends of the curved wall and this will ensure, when cap 13 is applied over a wheel in a manner to be described, that they will be aligned along the center of the tire periphery 33. It will also be seen that the buckle 37 is preferably of a type that allows it to be adjustably tightened around an embraced tire periphery, and is easily released when required. In some embodiments of the invention straps 15 and 17 may be composed of a resiliently stretchable material.

Figure 3:
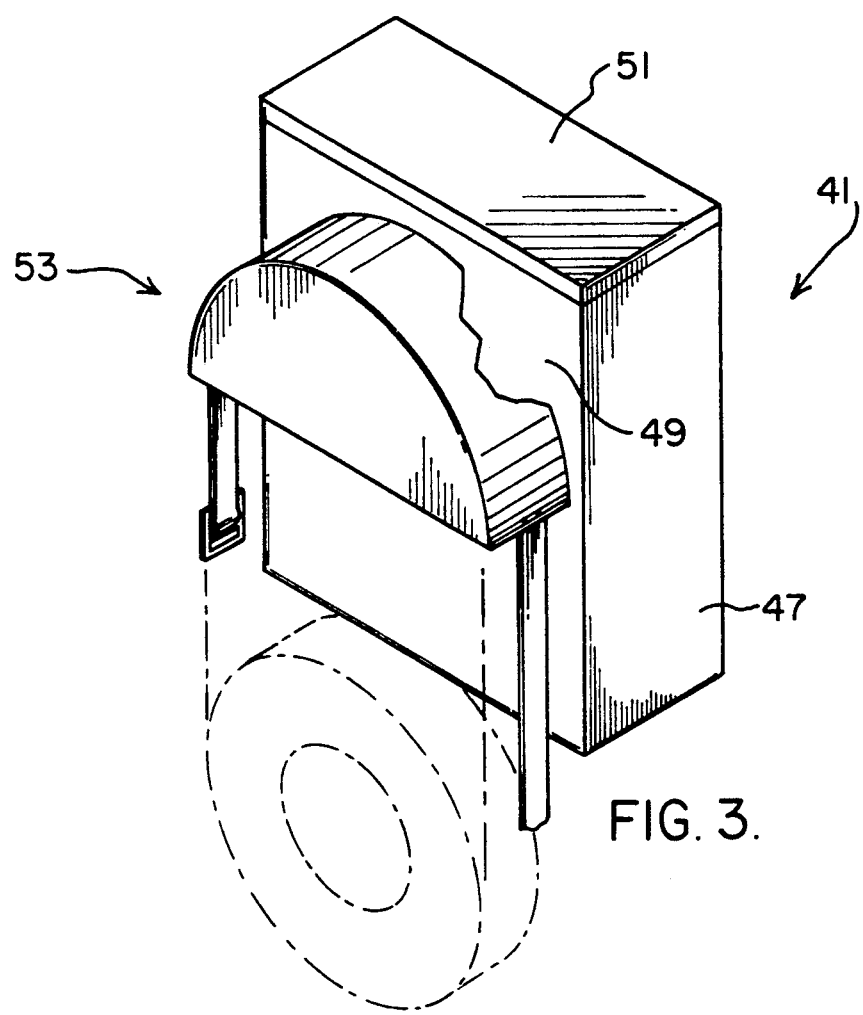
FIG. 3 is a perspective view showing a preferred embodiment of a spare wheel-mountable carrier according to the present invention.

The cap rear wall 21 is designed to be attached or have attached to it a holder for articles, or as shown in FIG. 3, a lid-equipped container 41. In FIG. 1 the preformed holes 43 allow bolts 45 or other suitable fasteners to be employed to this end.

The carrier shown in FIG. 3 has a container 41 with a bottom, spaced-apart side walls 47, rear wall, front wall 49 and a hinged lid 51 which can be locked in place to protect and secure contents of container 41. Here the inventive cap 53 is attached to the upper part of container wall 49. In some embodiments of the invention, it is contemplated that the curved wall of the cap is connected directly to the front wall of the carrier, which carrier wall will then serve as a cap rear wall. This will be found in cases where the cap and container are integrally molded or otherwise fabricated as one piece.

It is noted that the container 41 may be variously sized and configured to meet desired load capacity.

Figure 2:
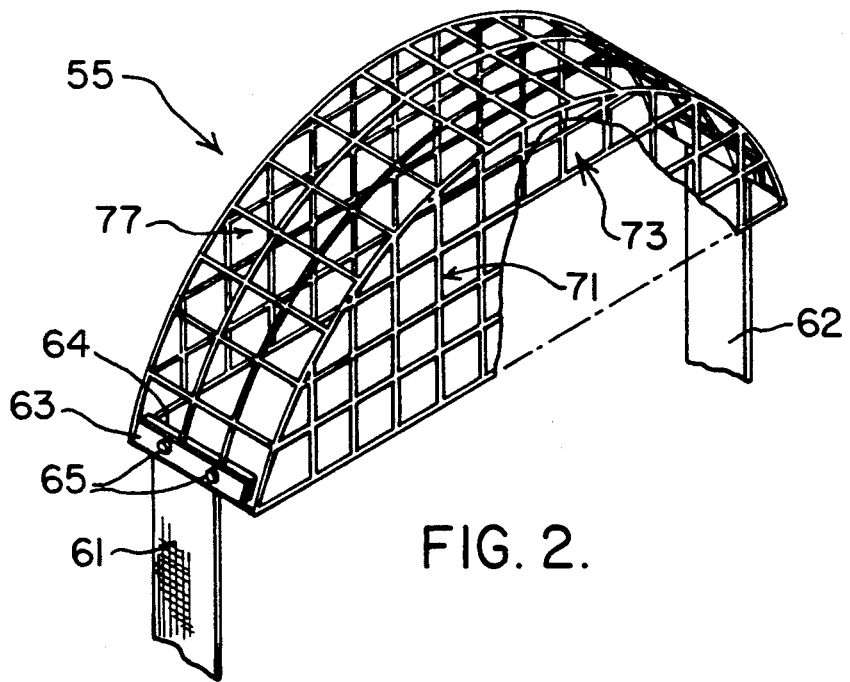
FIG. 2 is a perspective view of a variant of the present invention having a flexible mesh cap construction.

FIG. 2 illustrates an embodiment of the invention in which the cap 55 has a flexible mesh construction. The flexible cap may be formed of a stainless steel mesh or of a suitably strong reinforced plastic material, for example. One suitable way of attaching the nylon strap 61 and 62 to the flexible cap 55 involves clamping mesh material between opposed metal plates 63 and 64, using fasteners 65.

It will be evident to those with ordinary skill in the art that various other mounting plates or the like can be fashioned for securing a carrier or other load carrying holder to the flexible wall 71, and for securing a strap to the cap 55. It is contemplated that in other embodiments of the invention the cap 55 can have a combination of rigid and flexible walls, with the respect to front walls 73, curved walls 77 and rear walls 71.

Figure 4:
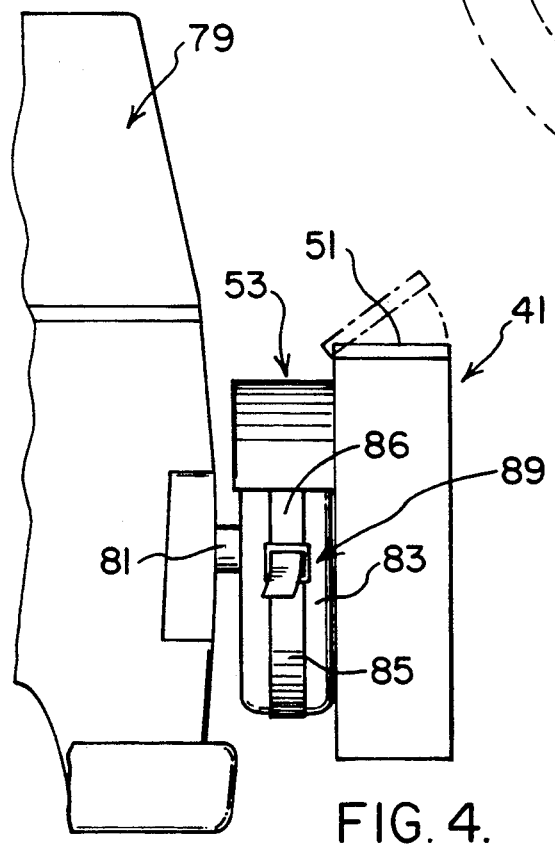
FIG. 4 is a partial elevational side view of the carrier of FIG. 3 mounted to a vehicle spare tire.

FIG. 4 shows how the carrier shown in FIG. 5 is mounted to the spare wheel at the rear of a vehicle 79. A conventional bracket mechanism 81 is secured to the hub of the spare wheel to hold the tire 83 spaced a fairly short distance from the back wall of vehicle 79 as shown. As suggested by FIG. 3 a carrier, according to the invention, is mounted to a spare tire by first unloosening the straps, aligning the cavity of the cap 53 above the spare wheel and then lowering it over the top of the spare wheel to the position shown in FIG. 4. The carrier can then be aligned in a generally upright position, and strap 85 connected to strap 86 using buckle 89 and then tightening and latched into engagement with the periphery of tire 83. This draws the concave surface of the cap 53 as well as the straps 86 and 85 into binding frictional engagement with the tire 83 to hold cap 53 against movement with respect to the spare wheel. Straps 85 and 86 can be easily unlatched when it is necessary to dismount a carrier 41 from the spare wheel.

While a few preferred embodiments have been described, it shall be appreciated by those with ordinary skill in the art that within the scope of the invention, various changes may be made. Thus, it is aimed to cover all such changes and modifications that fall within the true spirit and scope of the invention as defined by the claims which follow.

What is claimed is:

1. Carrier mount for attachment to an exteriorally mounted spare wheel of a vehicle, said spare wheel including a rubber tire and held in upright position adjacent to, and spaced from an exterior wall of said vehicle, said carrier mount including:
   a) a saddle cap having a front wall and a rear wall spaced from said front wall, and an intermediate wall adjoining said front and rear wall, said intermediate wall having spaced-apart first and second lower edges and providing a concave interior surface, said cap walls defining a downwardly facing cavity adapted to be received over an upper segment of said wheel, the rear wall of said cap adapted to support a means for holding articles; and
   b) adjustable strap means attached to said cap intermediate wall and adapted to extend downwardly from said lower edges, and whereby when said cap is received over said spare wheel said strap means is adapted to adjustably embrace a periphery of said tire.

2. Carrier mounted as defined in claim 1 wherein said means for holding articles is a carrier having spaced-apart front and rear walls, side walls and a bottom.

3. Carrier mount as defined in claim 1 wherein said concave interior surface is curved through a minor segment of a circle.

4. Carrier mount as defined in claim 1 wherein said cap forward wall is adapted to abut said tire to hold said cap against rearward movement, and said cap rear wall is adapted to abut said tire to hold said cap against forward motion.

5. Carrier mount as defined in claim 1 wherein said interior surface is adapted to make binding frictional engagement with said tire periphery.

6. Carrier mount as defined in claim 1 wherein said strap means is resiliently deformable.

7. Carrier mount as defined in claim 1 wherein said strap means comprises a first strap length that extends from one said lower edge and a second strap member that extends from said second lower edge and each strap member having a free end, and means for releasably and adjustably connecting said free ends to each other.

8. Carrier mount as defined in claim 2 wherein said cap rear wall is integral with said carrier front wall.

9. Carrier mount as defined in claim 2 wherein said cap rear wall is adapted to be secured to said carrier front wall.

10. Carrier mount as defined in claim 1 wherein said cap front wall and said cap rear wall have a configuration of a minor segment of a circle.

11. Carrier mount as defined in claim 1 wherein said cap is constructed of a flexible mesh material.

12. Carrier mount as defined in claim 1 wherein said intermediate wall is constructed of a flexible mesh material.

13. Claim mount as defined in claim 1 wherein said cap front wall and intermediate wall are constructed of a flexible mesh material.

14. Carrier mount as defined in claim 11 wherein said material is wire mesh.

15. Carrier mount as defined in claim 11 wherein said mesh is made of polymeric material.

16. Carrier mount as defined in claim 1 wherein said cap is adapted to cover about the upper ¼ to ⅓ of said wheel.

17. Carrier removably mountable to the spare wheel of a vehicle, said spare wheel including rubber tire and supported in an upright position adjacent to and spaced from an exterior wall of said vehicle, said carrier comprising:
 a) saddle cap having spaced-apart front and rear walls and a curved middle wall adjoining front and rear walls, said cap walls defining a downward facing cavity, said curved wall providing a concave surface for engaging the periphery of said tire, said cavity adapted to receive an upper segment of said wheel, said curved wall having a first lower edge portion spaced apart from a second lower edge portion;
 b) adjustable strap means extendable from said first lower edge portion to said second lower edge portion and adapted to releasably embrace a peripheral portion of said tire when said wheel is received in said cavity, to urge said cap downwardly into engagement with said tire; and
 c) carrier means having spaced-apart walls that define a storage space for articles, and affixed to the rear wall of said cap.

18. Carrier mount as defined in claim 17 wherein said carrier has a forward wall and the upper part of said forward wall is secured to said cap.

19. Carrier as defined in claim 17 wherein said cap front wall is adapted to hold said cap against rearward movement relative to said spare wheel and said cap rear wall is adapted to hold said cap against forward movement relative to said spare wheel.

20. Carrier as defined in claim 17 wherein said interior concave surface is adapted to make substantial surface to surface contact with said tire periphery.

21. Carrier as defined in claim 17 wherein said cap rear wall is integral with said carrier front wall.

22. Carrier as defined in claim 17 wherein said cap walls have a flexible mesh construction.

23. Carrier as defined in claim 13 wherein said cap front and curved walls have a flexible mesh construction.

* * * * *